July 12, 1927.
S. KAPLAN
1,635,325
AUTOMOBILE WHEEL
Filed April 28, 1924
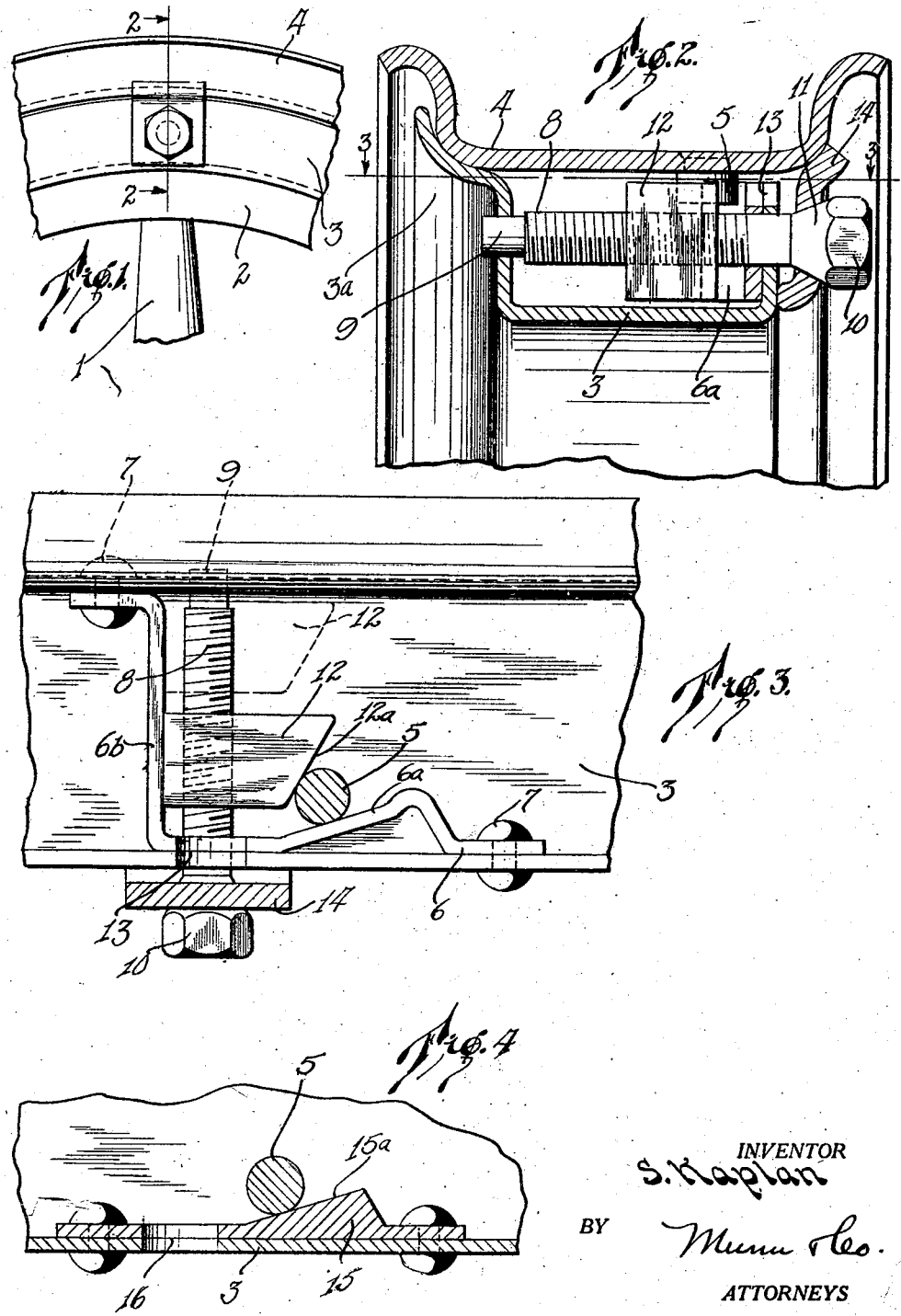
INVENTOR
S. Kaplan
BY Munn & Co.
ATTORNEYS Patented July 12, 1927.

1,635,325

UNITED STATES PATENT OFFICE.

SAMUEL KAPLAN, OF MONROE, LOUISIANA.

AUTOMOBILE WHEEL.

Application filed April 28, 1924. Serial No. 709,589.

My invention relates to improvements in automobile wheels, and it consists in the combinations, constructions, and arrangements herein described and claimed.

An object of my invention is to provide a device which is an improvement over those shown in my prior patent applications Serial No. 653,985, filed July 26, 1923 and Serial No. 689,765, filed January 31, 1924. The main improvement consists in the providing of a construction which may be used in connection with the wooden automobile wheel and steel felly in common use.

A further object of my invention is to provide an automobile wheel, including a demountable rim, which can be constructed at a minimum of cost.

A further object of my invention is to provide a device of the type described, in which the taking off and placing on of the rim, and the securing of the same in position, is more easily done.

Other objects and advantages will appear in the following specification, and the novel features of the invention will be particularly pointed out in the appended claims.

My invention is illustrated in the accompanying drawings, forming part of this application, in which Figure 1 is a side view of a portion of the device, Figure 2 is an enlarged section along the line 2—2 of Figure 1, Figure 3 is a section along the line 3—3 of Figure 1, and Figure 4 is a section through a portion of the device, showing the means for securing the rim to the felly.

In the drawings I have shown a wheel of the ordinary or artillery type. Thus in Figure 1, a spoke is indicated at 1, a wooden felly at 2, a fixed rim at 3, and a demountable rim at 4. It will be observed that the fixed rim 3 is U-shaped in cross section, and has an outwardly curved edge 3ª, against which a portion of the removable rim 4 bears.

The demountable rim 4 is provided on the inner face thereof with pins 5, like those shown in Figures 3 and 4.

The fixed rim 3 has secured to one edge thereof a cam plate 6, which has a V-shaped portion 6ª and a portion 6ᵇ which extends transversely to the other side of the rim. The ends of this plate 6 are preferably secured by means of rivets 7. A screw shaft 8 has a reduced end portion 9 arranged to enter an opening in one side of the fixed rim. The opposite end of the screw shaft extends through an opening in the side of the fixed rim, and is provided with a head 10, having a beveled portion 11. The screw 8 extends through a threaded locking member 12, one end of which is disposed adjacent to the portion 6ᵇ of the plate 6. The opposite end of the member 12 has a cam surface 12ª.

One side of the fixed rim 3 and the plate 6 adjacent to it are provided with registering openings 13, which permit the entrance of the pin 5. A washer 14 is provided, this washer being disposed on the tapered portion 11 of the head 10, as shown in Figure 2.

In Figure 4, I have shown one side of the fixed rim 3 as being provided with a cam plate 15, having a cam surface 15ª, and registering openings 16 in the side and in the plate. These openings, as will be seen later, are to permit the entrance of the pins 5. A number of cam plates similar to the plate 15 may be used on the fixed rim, while a similar number of pins 5, including one additional for a locking pin used in connection with the part shown in Figure 3, is provided, these pins being so spaced that any one may enter any one of the openings 13 or 16, when the other pins will be in registration with the remaining openings.

From the foregoing description of the various parts of the device, the operation thereof may be readily understood. Normally the locking member 12 is in the position shown in dotted lines in Figure 3. The demountable rim 4 may be placed on the fixed rim 3 by bringing any of the pins 5 into registration with the alined openings 13, when the other pins will be alined with the other openings 16. Now by pushing the demountable rim on the fixed rim from the right in Figure 2, the pins may enter through their respective openings, and then by moving the demountable rim with respect to the fixed rim, the pins 5 will engage the cam surfaces 15ª in Figure 4 and 6ª in Figure 3 to secure the parts together.

In order to prevent any retraction of the demountable rim, the locking member 12 may be brought forward from the dotted line position, shown in Figure 3, to the full line position by turning the head 10. Since the pin 5 is now between two inclined surfaces, it will be held secured, so that there will be no chance for a reverse movement between the parts when the locking member 12 is in position.

When the head 10 is turned up tight, it will bring the washer 14 into close engagement with the adjacent side of the demountable rim, and thus will hold the latter firmly in position, so that there will be no play in a radial direction between the demountable rim and the fixed rim. This washer 14 may be tightened at any time by turning the head, and this tightening will tend to draw the member 12 into still closer engagement with the pin 5, so as to lock the demountable rim against rotation. When it is desired to remove the rim 4, all that is necessary is to reverse the direction of rotation of the head 10, when the locking member 12 will be forced from its full line position, shown in Figure 3, to the dotted line position, being guided by the guide member 6b which prevents the rotation of the member 12. Then by rotating the fixed rim in the opposite direction, the pins 5 may be brought into registration with their openings 16, when the demountable rim may be lifted laterally from the fixed rim.

It will be observed that the member 12 serves not only as a locking member, but may serve as a positive means of moving the demountable rim with respect to the fixed rim, or of rotating it about the fixed rim, so as to bring the pins 5 into engagement with the cam surfaces.

I claim:

1. The combination with a fixed rim having a U-shaped cross section and a series of cam surfaces on the inner face of one side, of a demountable rim arranged to slip over said fixed rim and to engage the opposite side of said fixed rim, said demountable rim having inwardly projecting pins arranged to engage said cam surfaces when said demountable rim is rotated with respect to said fixed rim, a screw shaft carried by said fixed rim, a traveling locking member carried by said screw shaft and arranged to engage one of said pins, whereby said demountable rim is rotated to force said pins into engagement with said cam surfaces and to prevent a relative movement of said rims in the opposite direction.

2. The combination with a fixed rim having a U-shaped cross section and a series of cam surfaces on the inner face of one side, of a demountable rim arranged to slip over said fixed rim and to engage the opposite side of said fixed rim, said demountable rim having inwardly projecting pins arranged to engage said cam surfaces when said demountable rim is rotated with respect to said fixed rim, a screw shaft carried by said fixed rim, a traveling locking member carried by said screw shaft and arranged to engage one of said pins, whereby said demountable rim is rotated to force said pins into engagement with said cam surfaces and to prevent a relative movement of said rims in the opposite direction, and means for preventing the rotation of said locking member during its movement.

SAMUEL KAPLAN.